March 1, 1960
J. BRADLEY
2,926,536
MULTIPLE SPEED PHONOGRAPH TURNTABLE DRIVE MECHANISM
Filed Feb. 24, 1958
2 Sheets-Sheet 1
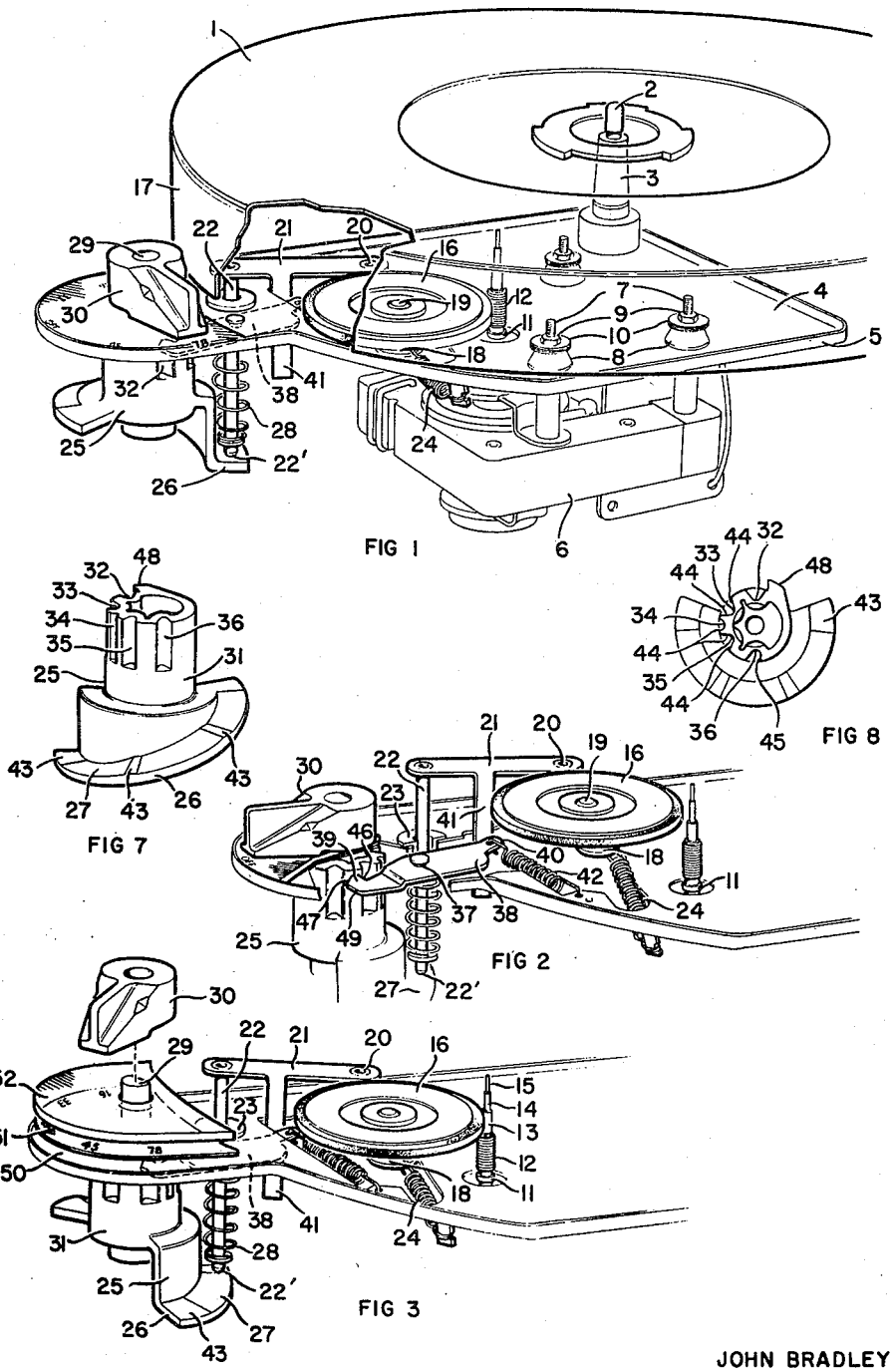
JOHN BRADLEY
INVENTOR
BY Douglas S. Johnson
PATENT ATTORNEY March 1, 1960  J. BRADLEY  2,926,536
MULTIPLE SPEED PHONOGRAPH TURNTABLE DRIVE MECHANISM
Filed Feb. 24, 1958  2 Sheets-Sheet 2

JOHN BRADLEY
INVENTOR
BY
PATENT ATTORNEY

United States Patent Office 2,926,536
Patented Mar. 1, 1960

2,926,536

MULTIPLE SPEED PHONOGRAPH TURNTABLE DRIVE MECHANISM

John Bradley, Toronto, Ontario, Canada, assignor to The Easy Washing Machine Company, Limited, Toronto, Ontario, Canada Application February 24, 1958, Serial No. 717,118

15 Claims. (Cl. 74—200)

This invention relates to improvements in multi-speed drive mechanisms for driving phonograph turntables, and the principal object of the invention is to provide a simpler, more compact and less costly mechanism than those previously available. More particularly, it is an object to enable the turntable to be started and stopped or operated at any selected one of a plurality of speeds, for instance, any one of the four speeds, 16, 33, 45 and 78 r.p.m. by means of a single simple operating control.

Another important object is to achieve starting, stopping and speed selection with a smooth and positive action, whereby the operator can easily control turntable operation and yet will have positive indication when the parts are set to correct operating position for the turntable operation desired.

Still another object is to achieve disengagement of the driving and driven parts both during the movements of the turntable control, during the changing of turntable speeds and when the turntable control is in the off or neutral position to prevent damage to the parts.

One important feature of the invention resides in the provision of a novel mounting for the idler wheel which provides a friction drive between stepped portions of the motor shaft and the rim of the turntable whereby the idler wheel is swingably supported from an axially shiftable pivot post.

Another important feature resides in the provision of a novel multi-function control member or cam for actuating the pivot post axially to bring the idler wheel into registration with a selected stepped portion of the motor shaft. Further, the control member is arranged to effect rotative or swinging movement of the pivot post to retract the idler wheel from engagement with the motor shaft during axial shifting of the post to change turntable speed or to stop the turntable.

Still another feature resides in utilizing a pawl as the means of translating the movement of the control member or cam into rotative movement of the pivot post, the pawl being arranged to drop into detents on the control member to correctly and positively locate the parts in selected operating positions. In this connection, it is another feature to utilize the pawl as a means of providing limits on the control member movement and hence axial shifting of the pivot post.

Still another feature resides in forming the multi-function control member or cam as a single casting.

Again it is a feature to provide for vertical preset adjustment of the idler wheel for motor shaft registration to accommodate tolerances of manufacture of the various component parts.

These and other objects and features will become apparent from the following detailed description taken in conjunction with the accompanying drawings in which:

Figure 1 is a perspective view of a drive mechanism embodying the invention and showing the position of the parts to drive a phonograph turntable which is shown in fragmentary form at maximum speed, viz. 78 r.p.m.

Figure 2 is a perspective view of the drive mechanism with the turntable and drive motor omitted and the frame being broken away to illustrate the relationship of the parts as the control member is moved to change driving speed;

Figure 3 is a view similar to Figure 2 but showing the relationship of the parts in position to drive the turntable at a speed of 45 r.p.m.;

Figure 7 is a perspective view of the control cam; and

Figure 8 is a top plan view of the cam of Figure 7.

Figure 4:
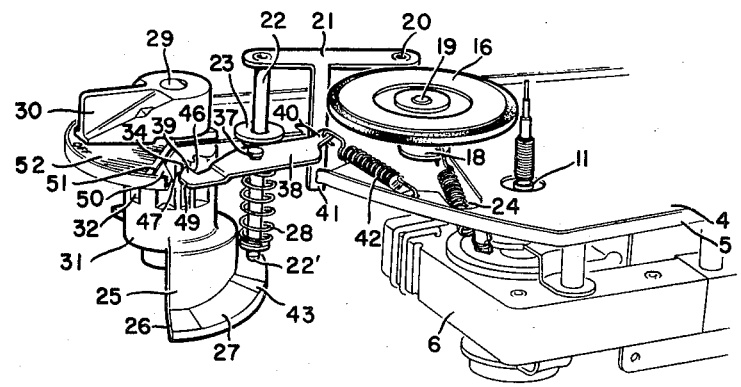
Figure 4 is a view similar to Figure 1, but with the turntable omitted and the frame broken away, showing the relationship of the parts in the neutral or off position.

With reference to Figure 1, a turntable 1 to be driven is shown supported for rotation about an upright or vertical post 2 supported in a suitable bushing 3 carried by a frame 4 in the form of a plate stamping having a peripheral reinforcing flange 5. Supported at the underside of the frame 4 is a suitable drive motor 6, the motor having secured thereto threaded posts 7 which extend up through resilient bushings 8 carried by the frame 4. Nuts 9 threaded on the posts 7 over washers 10 removably secure the motor in the resilient mounting formed by the bushings 8.

The motor is provided with a drive shaft 11, the upper end of which is stepped to provide the stepped portions 12, 13, 14 and 15 to be selectively engaged by an idler wheel 16 which, in turn, is arranged to engage the rim 17 of the turntable 1, the rim being of a substantial depth to permit such engagement throughout the vertical travel of the idler wheel as it selectively engages the stepped shaft portions 12 to 15.

Figure 6:
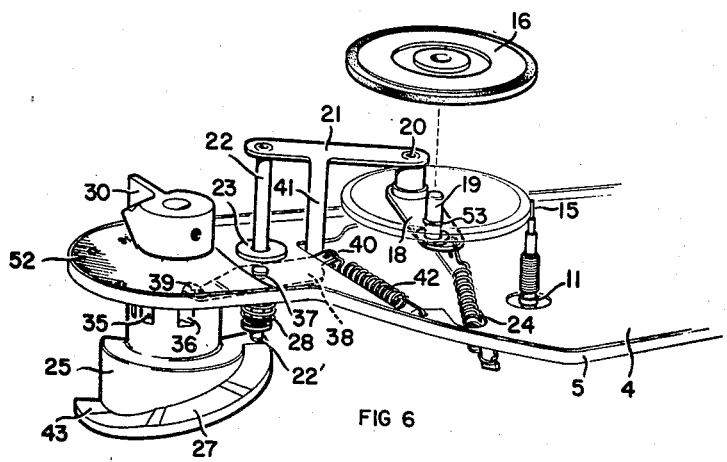
Figure 6 is a view similar to Figure 3, but showing the relationship of the parts to provide a turntable speed of 16 r.p.m., the idler wheel being shown in phantom in driving position and in full removed from the idler wheel shaft to illustrate its manner of adjustment thereon.

The mounting for the idler wheel, according to the invention, comprises an idler wheel plate as best seen in Figure 6 which carries an upright stud shaft 19 on which the idler wheel rotates. The idler wheel plate 18 is pivoted as at 20 to swing on an axis parallel to shaft 19 and motor shaft 11 from a shift plate 21 which is fixed to the upper end of an upright pivot post 22 which is axially slidable in a bearing boss 23 fixed to the frame 4. Thus, the idler wheel support as constituted by the idler wheel plate 18 and shift plate 21 is mounted for rotative movement about the axis of the pivot post 22 and also for vertical travel upon axial shifting of the pivot post 22.

A spring 24 fixed to the frame 4 and to the idler wheel plate 18 acts to bias the idler wheel in a direction to contact the motor shaft 11 and the rim of the turntable 1 at a point corresponding to the level at which the idler wheel lies, dependent upon the position of axial displacement of the pivot post 22. A control member, generally designated at 25, forms the means of effecting upward axial movement of the pivot post 22 to raise the idler wheel from its lowermost position as shown in Figure 1 to its uppermost position as shown in phantom in Figure 6. The control member 25 comprises a single casting having a flange 26 formed thereon to present a cam surface 27 against which the lower end of the pivot post 22 is adapted to bear under action of a spring 28. Preferably the lower end of the pivot post 22 is rounded as at 22' to provide substantially a point bearing on the cam surface 27.

As will be seen particularly from Figure 7, the control member 25 is supported to rotate about an upright or vertical pivot axis designated at 29, and the flange 26 rises axially in moving around the control member in an anti-clockwise direction.

The cam surface 27, thus defined by the flange 26, constitutes a cam ramp which, on turning of the control member 25 by means of a control knob 30, effects, for a clockwise movement of the control member, a raising of the axially shiftable pivot post 22 and hence idler wheel 16 supported thereby to bring the idler wheel successively into registration with the stepped portions 12 to 15 of the motor shaft.

Above the flange or ramp 26 the control member 25 has a cylindrical portion 31 which, as best seen in Figure 7, has formed therein a plurality of detents 32, 33, 34, 35 and 36.

Pivoted to the frame 4 on an axis 37 parallel to the axis of the pivot post 22, idler wheel shaft 19 and motor shaft 11 is a lever 38 in the form of a pawl having a projecting tooth 39 adapted to ride on the cylindrical portion 31 of the control member 25, and to selectively engage in the detents 32 to 36, as hereinafter more fully described. The opposite end 40 of the pawl 38 is arranged to engage a dependent arm 41 on the shift plate 21 when the tooth 39 is engaging on the cylindrical portion 31 of the control member to swing the idler wheel support about the axis of the pivot post 22 in a direction to retract the idler wheel from engagement with the motor shaft 11, and preferably also from the rim of the turntable 1.

A spring 42 acts on the end 40 of the pawl 38 to maintain the tooth 39 in engagement with the control member.

Preferably the cam surface 27 defined by the upper surface of the flange or ramp 26 of the control member is provided with flat or dwell portions 43 at points corresponding to the points at which the idler wheel 16 is in vertical registration with one of the stepped motor shaft portions 12 to 15. Also, the relationship of the pawl 38 and detents 32, 33, 35 and 36 is such that the tooth 39 of the pawl will drop into one of the respective detents at the point at which the idler wheel is in vertical registration with a corresponding stepped shaft portion.

When the pawl tooth drops into one of the detents 32, 33, 35 and 36 under action of the spring 42, the end 40 of the pawl will clear the arm 41 of the shift plate, allowing spring 24 to draw the idler wheel into engagement with the registering stepped motor shaft portion. This relationship will be seen with reference to the individual figures, where, for instance, as shown in Figure 1, the tooth of the pawl 38 has dropped into detent 32 at the point where the pivot post 22 is at its lowermost position to bring the idler wheel 20 into registration with the large motor shaft portion 12. Figure 3 shows the relationship of the parts when the control member 25 has been turned to a point to raise the pivot post 22 a sufficient distance to bring the idler wheel 16 into registration with the successive stepped portion 13 of the motor shaft, at which time the tooth of the pawl 38 will have dropped into the detent 33 to allow the idler wheel control spring 24 to draw the idler wheel into engagement with the shaft portion 13.

As shown in Figure 2, as the control member 25 is turned between the positions of Figures 1 and 3, the tooth portion 39 of the pawl 38 will have been caused to ride out of the detent 32 and onto a cylindrical surface portion of the control member 25 with the result that the opposite end 40 of the pawl will have been displaced against the action of the spring 42 to engage the dependent arm 41 of the shift plate to swing the shift plate about the axis of the pivot post 22 to retract the idler wheel 16 against the action of the spring 24, at least from engagement with the motor shaft. Thus, during axial shifting of the pivot post 22, the idler wheel is actuated by means of the control member 25 through the pawl 38 to disengage the motor shaft 11 to prevent damage of the parts.

Figure 5:
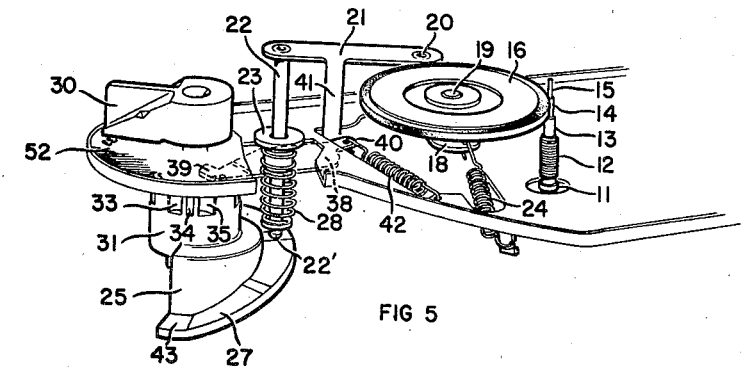
Figure 5 is a view similar to Figure 3, but showing the parts in position for driving the turntable at 33 r.p.m., the frame being broken away and the lever pawl shown in dotted lines.

Figures 5 and 6 illustrate the relationship of the parts as the control member is turned further to bring the idler wheel 16 successively into registration with the motor shaft stepped portions 14 and 15. It will be seen that the detents 32, 33, 35 and 36 are of a substantial depth so that when the tooth portion 39 of the lever or pawl 38 drops into these detents the end 40 of the pawl or lever will clear the shift plate arm 41 to allow the spring 24 to move the idler wheel into engagement with the motor shaft. Detent 34, however, is shallower than the other detents, and as shown in Figure 4, when the tooth portion 39 of the pawl or lever 38 drops into this detent 34, the pawl will still block movement of the shift plate 21 about the axis of the pivot post 22 to prevent the idler wheel from touching the motor shaft 11. The location of the parts as shown in Figure 4 is a neutral position whereby drive to the turntable is halted and the idler wheel is maintained out of contact with the motor shaft to prevent a set taking place in the resilient surface of the idler wheel.

It will be understood that as the operator turns the control member 25 through the control knob 30, a positive indication will be given to him each time the tooth portion 39 of the pawl drops into a detent and he will know that he has turned the control member the correct distance to achieve proper engagement of the parts for the speed selected as determined by detents 32, 33, 35 and 36, and also a proper relationship of the parts for the off or neutral position when the tooth of the pawl drops into the detent 34. In this connection, it will be noted from Figure 8 that while the detents 33, 34 and 35 have diverging side walls 44 to cooperate with the pawl tooth 39 and achieve a camming of the pawl tooth out of the detent on turning the control member the detent 36 has one wall 45 disposed to extend substantially parallel to a radius through the centre of the detent, and the pawl tooth is provided with a corresponding surface 46 substantially parallel to the path of travel to which the tooth is constrained on swinging on its axis 37 whereby there will be substantially zero camming effect acting to cam the tooth 39 out of the detent 35 upon the application of a further turning force applied to continue the movement of the control member from the position of Figure 6 in a clockwise direction.

Thus the cooperating surfaces 45 and 46 of the detent 36 and pawl tooth 39 form engaging stop surfaces to limit clockwise rotation of the control member.

To permit anti-clockwise rotation of the control member, the tooth 39 of the pawl is provided with an inclined surface 47 as its outer surface to assist the pawl in climbing up out of the detents as pressure is applied to reverse the movement of the control member from the position of Figure 6 back to the position of Figure 1.

As will be seen particularly from Figure 8, detent 32 has a projecting wall portion 48 which is adapted to overlie the end portion 49 of the pawl 38 to provide a stop therefor to limit the anti-clockwise rotation of the control member.

With the construction illustrated, it will be seen that a very simple compact multi-speed control mechanism has been provided wherein both the vertical movement of the idler wheel to bring it into selective registration with the several stepped portions of the motor shaft and horizontal movement of the idler wheel to retract it from engagement with the motor shaft during vertical travel and in the neutral position is achieved with a single control member, which conveniently may form a single die casting.

As illustrated in Figure 3, the portion 50 of the frame 4, which extends beyond the turntable to support the control member 25 and its operating control knob 30, is extremely compact and is adapted for corner mounting in a cabinet or the like. Conveniently, also, this frame portion 50 may form a receptacle for a replaceable indicia bearing indicator plate 51 which may be conveniently covered by a suitable plastic covering 52.

Due to error in tolerances at times when the parts are assembled, it may occur that the idler wheel 16 is not in proper registration with the stepped portions 12, 13, 14 and 15 when the pawl tooth 39 drops into the detents 32, 33, 35 and 36 respectively, and accordingly the idler wheel is frictionally held on its shaft 19 by means of an internal C-spring 53 as shown in Figure 6 for axial adjustment to accommodate such variations in tolerances.

It will be understood that various modifications in detail and in the arrangement and construction of the parts may be made without departing from the spirit of the invention and scope of the appended claims.

What I claim as my invention is:

1. A multiple speed drive mechanism for a phonograph turntable comprising an upright motor driven shaft having a plurality of stepped portions, an idler wheel supported on a jointed cantilever arm mounted on an upright axially shiftable pivot post, a control member supporting said pivot post at its lower end and being adapted to actuate said post axially to selectively move said idler wheel into registration with a selected stepped portion of said shaft, compression spring means carried by said post urging same into contact with said control member, means biasing said idler wheel towards engagement with said shaft, and means adapted to swing said idler wheel about said post away from said shaft while said post is being actuated axially.

2. A multiple speed drive mechanism for a phonograph turntable comprising an upright motor driven shaft having a plurality of stepped portions at the upper end thereof, a shiftable cantilever idler wheel support rigidly connected at one end to an upright axially shiftable pivot post, an idler wheel carried by said shiftable cantilever support to rotate about an upright axis, a control member supporting said post on its lower end and being adapted to actuate said post axially to selectively move said idler wheel into vertical registration with a selected stepped portion of said shaft, compression spring means carried by said post urging same into contact with said control member, means biasing said idler wheel support in a direction to urge said idler wheel into engagement with said shaft, and means actuated by said control member to swing said idler wheel support about said pivot post to retract said idler wheel from shaft engagement while said post is being actuated axially.

3. A multiple speed drive mechanism for a phonograph turntable comprising an upright motor driven shaft having a plurality of stepped portions at the upper end thereof, an idler wheel for selectively engaging the stepped portions of said shaft and adapted to frictionally engage the rim of a turntable to provide a drive between said motor shaft and turntable, an upright pivot post supported for axial and rotative shifting, a shift plate fixed to said pivot post and an idler wheel plate pivoted from said shift plate to swing on an axis parallel to said pivot post and motor shaft, said idler wheel being rotatably supported on an idler wheel shaft carried by said idler wheel plate and disposed parallel to said pivot post and motor shaft, means biasing said idler wheel plate to swing same on said pivot post to bring said idler wheel into engagement with the stepped upper end of said shaft, a control member mounted to turn on an upright axis and having a peripheral cam surface which rises axially around said control member for actuating said pivot post axially upon turning of said control member to move said idler wheel successively into registration with the stepped portions of said motor shaft, and means actuated by said control member for swinging said idler wheel plate on said pivot post in a direction to retract said idler wheel at least from motor shaft engagement while said pivot post is being moved axially between positions at which said idler wheel registers with a stepped portion of said motor shaft.

4. A device as claimed in claim 3 in which said peripheral cam surface comprises a peripheral outwardly projecting camming flange rising axially around said control member and on which the lower end of said axially shiftable pivot post bears, and compression spring means mounted on said pivot post and biasing said pivot post into engagement with said camming flange.

5. A device as claimed in claim 4 in which said flange is formed with peripherally spaced dwell portions to correspond with positions of axial displacement of said pivot post which bring said idler wheel into registration with a stepped portion of said motor shaft.

6. A device as claimed in claim 3 in which said control member and idler wheel retracting means actuated thereby have cooperating detent and projecting formations forming control member position locating means indicating positions of drive registration of said idler wheel and motor shaft.

7. A device as claimed in claim 3 in which said means for swinging said idler wheel plate on said pivot post comprises a lever member pivotally supported intermediately of its length and acting on said shift plate at one end and engaging said control member at the other end, said control member having cam means formed thereon to actuate said lever in a direction to swing said shift plate and retract said idler wheel while said pivot is being moved axially, and means biasing said lever against said latter cam means.

8. A device as claimed in claim 7 in which said control member is provided with a cylindrical portion having detents around the periphery thereof and said lever comprises a pawl having a projection disposed to successively drop into said detents as said control member is turned to successively bring said idler wheel into registration with said motor shaft stepped portions, said projection on riding out of said detents on turning of said control member swinging said idler wheel support to retract said idler wheel from said motor shaft.

9. A device as claimed in claim 8 in which said detents and pawl projection are formed to provide positive interengaging stops at desired limits of pivot post axial shifting corresponding to the limits of the range of desired idler wheel travel along said upright motor shaft.

10. A device as claimed in claim 3 in which said idler wheel is mounted for frictional adjustment along said idler wheel shaft.

11. A multiple speed drive mechanism for a phonograph turntable comprising an upright motor driven shaft having a plurality of stepped portions at the upper end thereof, an idler wheel for selectively engaging the stepped portions of said shaft and adapted to frictionally engage the rim of a turntable to provide drive between said motor shaft and turntable, a support for said idler wheel comprising a shift plate fixed to an upright pivot post extending parallel to said motor shaft and supported for axial and rotative shifting, an idler wheel plate pivotally carried by said shift plate to swing on an axis parallel to said pivot post and motor shaft, said idler wheel being rotatably supported from said idler wheel plate to rotate on an axis parallel to said motor shaft, biasing means acting on said idler wheel plate and shift plate to urge said idler wheel into engagement with a registering portion of the upper end of said motor shaft, a control member supported to turn on an axis parallel to said pivot post and having a cam surface in the form of a peripheral flange on which the lower end of said pivot post is adapted to bear, means biasing said pivot post into engagement with said cam surface, said cam surface axially rising around said control member and adapted on turning of said control member in one direction to raise said post and hence said shaft and idler wheel plates to bring said idler wheel successively into registration with successively higher stepped portions of said motor shaft and vice versa, a pawl member pivoted intermediately of its length to swing on an axis parallel to said pivot post and motor shaft, said pawl having one end riding on the periphery of said control member and the other end disposed to actuate said shift plate to shift same in a direction to retract said idler wheel at least from engagement with said motor shaft with said idler wheel out of registration with a stepped portion of said motor shaft, means biasing said one pawl end into engagement with the periphery of said control member, said control member having detents of substantial depth in the peripheral portion thereof on which said one pawl end rides at points corresponding to points of axial pivot post displacement to bring said idler wheel into registration with a stepped portion of said motor shaft, said pawl being adapted to drop into said detents to release said shift plate for swinging movement under action of said first-mentioned biasing means to bring said idler wheel into engagement with a registering stepped motor shaft portion and a further detent in the peripheral portion of said control member on which the one end of said pawl rides and into which said pawl end is adapted to drop, said latter detent being shallower than the aforesaid detents whereby said shift plate is held from swinging movement sufficient to hold said idler wheel out of engagement with said motor shaft.

12. A device as claimed in claim 11 in which a further detent is located between two of the first-mentioned detents.

13. A device as claimed in claim 12 in which said pawl and said detents are formed with cam surfaces adapted on turning of said control member through a peripheral extent corresponding to the peripheral separation of the first and last detent to effect a riding of the pawl into and out of the detents, said first and last detents having stop surfaces to stop riding out movement of said pawl under the application of a force to turn said control member beyond the range of movement of first and last detent and pawl registration.

14. A multiple speed drive mechanism for a phonograph turntable comprising an upright motor driven shaft having a plurality of stepped portions at the upper end thereof, a shiftable idler wheel support carried by an upright axially shiftable pivot post, an idler wheel carried by said support to rotate about an upright axis, a control member mounted to turn on an axis parallel to said pivot post and having a peripheral cam formation for actuating said post axially to selectively move said idler wheel into vertical registration with a selected stepped portion of said motor driven shaft, means biasing said idler wheel support in a direction to urge said idler wheel into engagement with said shaft, said control member having a cylindrical surface portion, a pawl pivoted intermediate of its length on an axis parallel to said pivot post and having one end riding on the cylindrical surface portion of said control member and having its other end acting on said idler wheel support to displace same in a direction to retract said idler wheel against the action of said biasing means from shaft engagement, said cylindrical surface portion having detents of substantial depth at peripherally spaced points corresponding to the points at which said peripheral cam formation displaces said pivot post to move said idler wheel into vertical registration with the stepped portions of said motor driven shaft, said one pawl end being adapted to drop into said detents upon turning of said control member a sufficient distance to release said idler wheel support for swinging movement under said biasing means to bring said idler wheel into engagement with a registering stepped motor shaft portion and means biasing said pawl to drop into said detents, said cylindrical portion of said control member having a further detent shallower than and located between two of the aforesaid detents, said pawl being adapted to drop into said shallower detent to provide a located neutral position of the idler wheel and motor driven shaft without releasing said idler wheel support for movement sufficient to bring said idler wheel into engagement with said motor driven shaft.

15. A device as claimed in claim 14 in which the most remote of said detents are provided with stop surface formations for cooperation with said pawl to limit control member turning to the peripheral arc between said most remote detents.

References Cited in the file of this patent
UNITED STATES PATENTS

| | | |
|---|---|---|
| 2,438,264 | Bender | Mar. 23, 1948 |

FOREIGN PATENTS

| | | |
|---|---|---|
| 714,813 | Great Britain | Sept. 1, 1954 |
| 745,143 | Great Britain | Feb. 22, 1956 |